June 11, 1968 F. S. NICHOLS ET AL 3,388,212
PLASTIC BUSHING FOR ELECTRICAL APPARATUS AND METHOD OF MAKING
Filed July 7, 1965
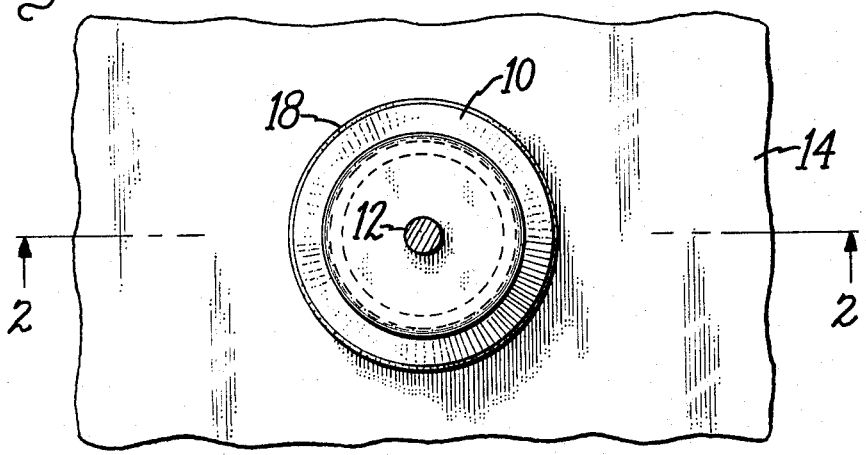
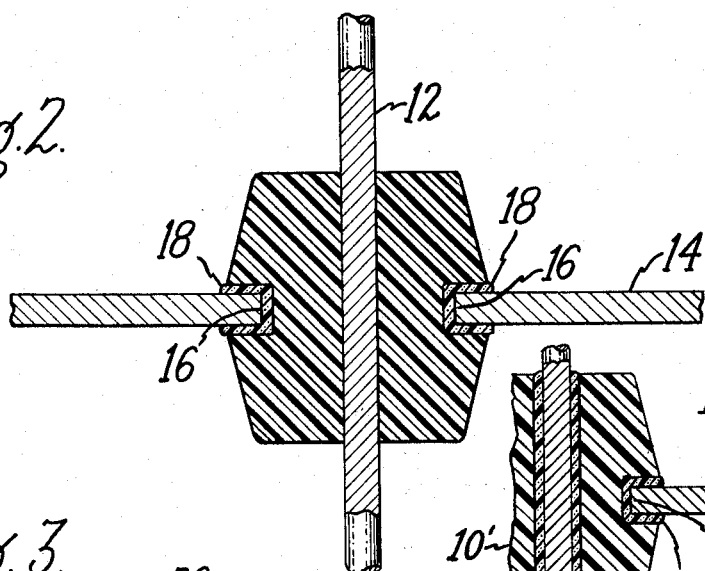
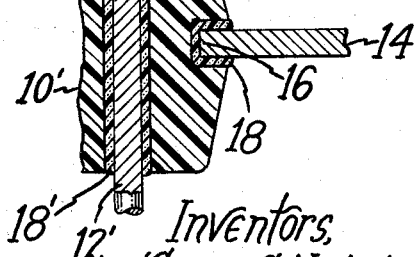
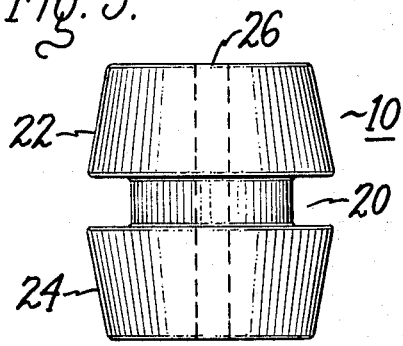
Inventors,
Frank S. Nichols,
Goldner F. Lipsey,
Gordon C. Nonken,
by Francis K. Doyle
Their Attorney.

3,388,212
PLASTIC BUSHING FOR ELECTRICAL APPARATUS AND METHOD OF MAKING
Frank S. Nichols, Goldner F. Lipsey, and Gordon C. Nonken, Pittsfield, Mass., assignors to General Electric Company, a corporation of New York
Filed July 7, 1965, Ser. No. 470,068
8 Claims. (Cl. 174—153)

This invention relates to bushings for electrical apparatus and more particularly to a plastic bushing for electrical apparatus and the method of making such bushing.

As is well known to those skilled in the electrical art, bushings find wide use in such art. In general, bushings are connected to a wall member which is normally the enclosure for an electrical apparatus. The bushings surround a conductor which is carried through the wall member. The conductor is energized and is insulated from the wall member, which is normally at ground potential, by the bushing. In many types of electrical apparatus the apparatus is sealed within an enclosure which may be filled with a dielectric fluid. When used in sealed apparatus it is necessary that the bushing be sealed to the wall member.

In many instances sealed bushings are made of porcelain and are sealed to the wall member by compressing a gasket between portions of the bushing and the wall member. This type of bushing construction is relatively expensive considering both the cost of the porcelain member and the labor required in assembling of such bushings. Further, as is well known, porcelain is a very fragile material, thus porcelain bushings are very susceptible to damage during shipping and installation.

It has been proposed to make bushings of a plastic material molded directly to the wall member. As is well known, these materials are very strong and are not easily damaged. In fact, with some types of plastic materials bushings formed therefrom may be deliberately mishandled without breaking. However, with plastic bushings it is very difficult to maintain a seal between the bushing and the wall member. This problem arises from the stresses which are set up in the plastic during curing and in the plastic-to-metal bond caused by large variations in temperature.

Therefore, it is one object of this invention to provide a plastic bushing sealed to the wall member of an electrical apparatus.

A further object of this invention is to provide a plastic bushing sealed to a wall member of an electrical apparatus by a novel plastic-to-metal seal.

Yet another object of this invention is to provide a plastic-to-metal seal for a plastic bushing in the wall member of an electrical apparatus which will eliminate stresses therein.

A still further object of this invention is to provide a plastic bushing molded directly to the wall member of an electrical apparatus and having a novel plastic-to-metal seal.

In carrying out this invention in one form, a thin coating of uncured elastomer is vulcanized on to the portions of a wall member surrounding an opening therein. A plastic bushing is molded over the elastomer on the wall member and cured. The curing of the plastic forms a strong bond to the elastomer, sealing the bushing to the wall member. The flexibility of the elastomer eliminates stresses in both the bushing and in the plastic-to-metal seal.

The invention which is sought to be protected will be particularly pointed out and distinctly claimed in the claims appended hereto. However, it is believed that this invention and the manner in which its various objects and advantages are obtained, as well as other objects and advantages thereof will be more clearly understood by reference to the following detailed description of a preferred embodiment thereof, particularly when considered in the light of the accompanying drawing, in which:

FIGURE 1 is a top view of a bushing and wall member according to one form of this invention;

FIGURE 2 is a sectional view of the bushing of FIG. 1 taken on the line 2—2 of FIG. 1;

FIGURE 3 is a side view of one form of bushing according to this invention; and

FIGURE 4 is a sectional view similar to FIGURE 2 showing a modification of this invention.

According to this invention a plastic bushing is molded directly to a wall member of an electrical apparatus providing a sealed entrance for an electrical conductor to such electrical apparatus. To provide a permanent seal, an elastomer is coated on the wall member surrounding the opening therein prior to the molding of the bushing. When cured, the elastomer provides a plastic-to-metal seal tightly bonded to both the wall member and the plastic bushing. The elastomer is flexible and will readily follow any dimensional changes of the bushing and the wall member during temperature changes without stressing the assembly. Thus, a permanent seal is provided between the bushing and the wall member.

Reference will now be made to the drawing in which like numerals are used to indicate like parts throughout the various views. Considering first FIG. 1, there is shown the top view of a plastic bushing 10 having an electrical conductor 12 extending therethrough. The plastic bushing 10 is sealed to a wall member 14 which may form part of the enclosure of an electrical apparatus. As will be understood, the plastic bushing 10 provides a sealed entrance for the electrical conductor 12 to the electrical apparatus which is enclosed in part by the wall member 14.

FIGURE 2 of the drawing shows the novel sealing means of this invention. As shown in FIG. 2, the wall member 14 has an opening 16 therein. A plastic bushing 10 is molded to wall member 14 through the opening 16. To provide the necessary sealing, a coating of an elastomer, as at 18, is provided on the wall member 14 completely surrounding the opening 16. After the coating 18 has been applied to wall member 14 about the opening 16 it is vulcanized thereto. The plastic bushing 10 is then molded to wall member 14, as shown. The plastic is then cured. As will be understood, the elastomer provides a flexible sealing member securely bonded to both the plastic bushing 10 and the wall member 14. The flexible elastomer 18 will readily follow the dimensional changes of plastic bushing 10 during the curing thereof and also during any temperature changes, thereby maintaining a permanent seal between the bushing 10 and the wall member 14.

In various bushings which have been made according to this invention, the plastic material has been an epoxy, while the elastomer has been a polyacrylic. The elastomer coating is desirably of the order of 5 to 50 mils in thickness to provide an adequate, flexible seal. Less than 5 mils in thickness does not provide sufficient elastomer to obtain the desired flexible seal. If the thickness is much more than approximately 50 mils the bushing 10 will not be sufficiently rigid with respect to the wall member 14.

FIGURE 3 shows one form of molded bushing according to this invention. As can be seen from FIG. 3, the bushing 10 has a groove 20 which is molded about the opening 16 of the wall member 14. The upper and lower portions 22 and 24, respectively, are symmetrically and substantially in the shape of a truncated cone. Of course, a bore 26 is provided which receives the conductor 12. While a preferred form of bushing is shown in FIG. 3 it will of course be understood that in the preferred form of the invention the bushing 10 is molded directly in place in wall member 14 with conductor 12 molded therein. Further, it will be understood that various shapes of bushings may be provided as may be desired, or necessary, for the particular type of electrical apparatus used.

Referring to FIGURE 4, a modification of the invention will be described. In FIG. 4, the wall 14 is shown with an opening 16 therein and a coating of elastomer 18 surrounding opening 16, vulcanized to wall 14. A bushing 10' is shown, molded to wall 14, through opening 16. A conductor 12' extends through bushing 10' and is sealed to bushing 10' by a layer 18' of elastomer material which is vulcanized to conductor 12'. In many instances it is desired to bring a conductor of substantial mass through a bushing member. When the conductor is sufficiently large, sufficient dimensional changes may take place during curing of the bushing or during temperature changes to impair the seal between the bushing and the conductor. To obviate this problem, the vulcanized coating 18' may be applied to the conductor 12'. As will be understood, the elastomer 18' will function in the same manner as the elastomer 18 to provide a flexible seal bonded securely to the conductor 12' and the bushing 10'.

The bushing herein shown finds particular utility in hermetically sealed transformers, such as are described and claimed in application Ser. No. 387,125 filed Aug. 3, 1964, now Patent Number 3,233,198, in the name of R. F. Schrader et al. and assigned to the same assignee as this application. Of course, it will be apparent that the plastic bushing sealed to a wall member as disclosed in this application will find utility in many types of electrical apparatus and it not limited to hermetically sealed transformers. However, it is especially useful therein since the sealing, as provided in this invention, is a permanent hermetical seal which will not leak because of stresses which may be set up by temperature cycling or from physical abuse which the bushing may undergo during installation of the transformer.

While there has been shown and described the present preferred embodiment of this invention it will be obvious to those skilled in the art that many changes may be made without departing from the spirit and scope of the invention, particularly as it is defined in the appended claims.

What is claimed as new and which it is desired to secure by Letters Patent of the United States is:

1. A method of molding a plastic bushing to a wall member of an electrical apparatus comprising:
   (A) providing an opening through said wall member,
   (B) coating said wall member surrounding said opening with a coating of elastomer and vulcanizing said elastomer,
   (C) molding a plastic bushing in said wall member and through said opening therein, and
   (D) curing said plastic bushing to bond said plastic bushing to said vulcanized elastomer.

2. A method of molding a plastic bushing to a wall member of an electrical apparatus comprising:
   (A) providing an opening through said wall member,
   (B) coating said wall member surrounding said opening with a coating of elastomer, and vulcanizing said elastomer coating,
   (C) placing a conductor centrally in said opening and extending therethrough,
   (D) molding a plastic bushing in said wall member through said opening therein, and about said conductor, and
   (E) curing said plastic bushing to bond said plastic bushing to said vulcanized elastomer.

3. A method of molding a plastic bushing to a wall member of an electrical apparatus comprising:
   (A) providing an opening through said wall member,
   (B) coating said wall member surrounding said opening with a coating of elastomer, and vulcanizing said elastomer coating,
   (C) coating a portion of a conductor with an elastomer and vulcanizing said elastomer,
   (D) placing said coated portion of said conductor centrally in said opening, and extending therethrough,
   (E) molding a plastic bushing in said wall member through said opening therein, and about said coated portion of said conductor, and
   (F) curing said plastic bushing to bond said plastic bushing to said vulcanized elastomer.

4. A sealed plastic bushing for electrical apparatus comprising:
   (A) a wall member having an opening therethrough,
   (B) a plastic bushing molded in said wall member and extending through said opening, and
   (C) a coating of vulcanized elastomer surrounding said opening and securely bonded to said wall member and said plastic bushing.

5. A sealed plastic bushing for electrical apparatus comprising:
   (A) a wall member having an opening therethrough,
   (B) a plastic bushing molded in said wall member and extending through said opening,
   (C) a conductor molded in said bushing, and
   (D) a coating of vulcanized elastomer surrounding said opening and securely bonded to said wall member and said plastic bushing.

6. A sealed plastic bushing for electrical apparatus comprising:
   (A) a wall member having an opening therethrough,
   (B) a plastic bushing molded in said wall member and extending through said opening,
   (C) a conductor having a portion molded in said bushing, said portion having a coating of vulcanized elastomer securely bonded to said portion of said conductor and said plastic bushing, and
   (D) a coating of vulcanized elastomer surrounding said opening and securely bonded to said wall member and said plastic bushing.

7. A method of molding a plastic bushing to a wall member of an electrical apparatus as claimed in claim 2 in which said coating of elastomer is between 5 and 50 mils in thickness.

8. A sealed plastic bushing for electrical apparatus as claimed in claim 5 in which said coating of vulcanized elastomer is between 5 and 50 mils in thickness.

References Cited

UNITED STATES PATENTS

| 1,027,404 | 5/1912 | Deibel | 174—153 |
| 2,392,311 | 1/1946 | Christopher | 174—526 |
| 2,743,308 | 4/1956 | Bardsley | 264—255 |
| 2,909,740 | 10/1959 | Seidel et al. | 74—52 |

FOREIGN PATENTS

| 942,155 | 4/1956 | Germany. |
| 186,594 | 12/1963 | Sweden. |

LARAMIE E. ASKIN, *Primary Examiner.*